United States Patent [19]
Seem

[11] 3,921,723
[45] Nov. 25, 1975

[54] HARVESTING MACHINE
[76] Inventor: David M. Seem, R.D. 2, Kutztown, Pa. 19530
[22] Filed: May 2, 1974
[21] Appl. No.: 466,152

[52] U.S. Cl. .................. 171/14; 56/327 R; 171/27
[51] Int. Cl.² ........................................ A01D 17/04
[58] Field of Search ........ 56/327 R; 171/27, 28, 31, 171/42, 71, 88, 14

[56] References Cited
UNITED STATES PATENTS

| | | | |
|---|---|---|---|
| 2,588,764 | 3/1952 | Richmond | 56/327 R |
| 2,648,942 | 8/1953 | Grant et al. | 171/42 X |
| 3,690,049 | 9/1971 | Roberson | 171/27 X |
| 3,810,512 | 5/1974 | Porter | 171/27 X |

Primary Examiner—J. N. Eskovitz

[57] ABSTRACT

A mechanical assemblage of rotary cutting discs on a harvesting machine is provided for cutting and removing tomato plants and the like from their growth positions in the soil over relatively wide widths of rows. This assemblage also spreads and delivers the severed plants and their fruit to a relatively wide conveyor belt for separation from soil, surface debris, and plant residues.

4 Claims, 8 Drawing Figures

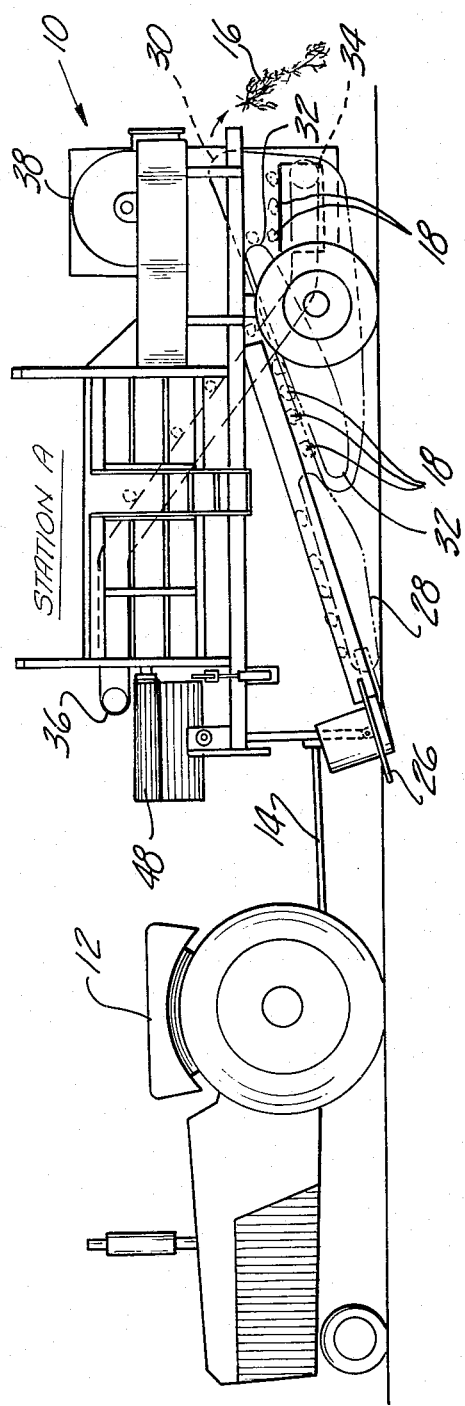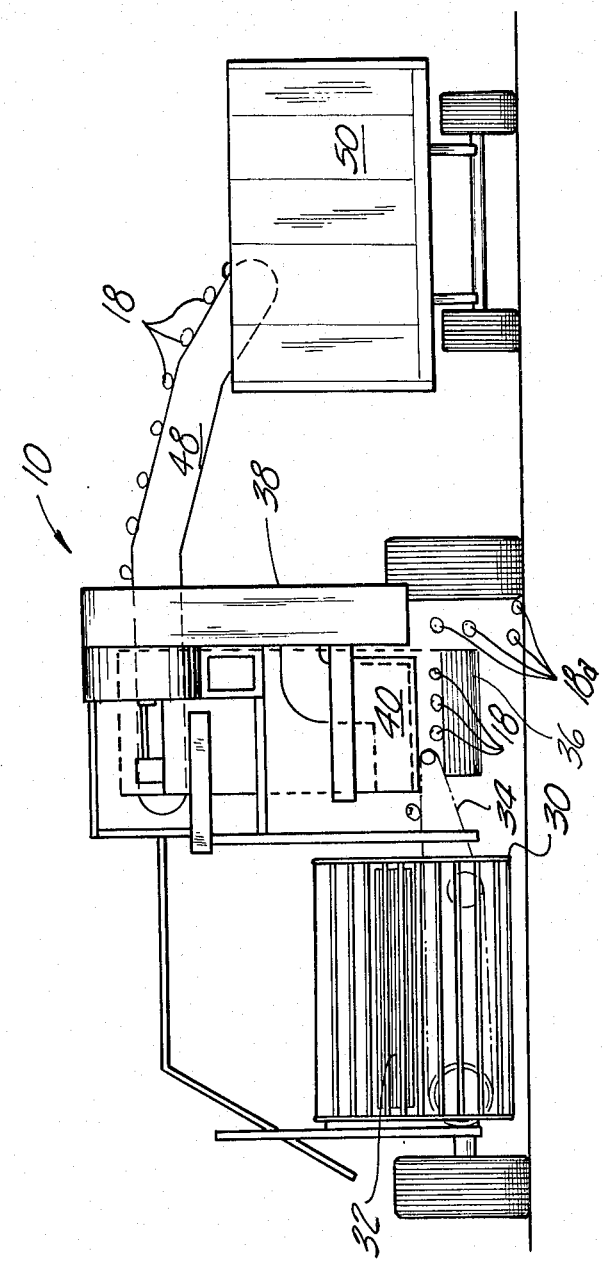

HARVESTING MACHINE

The excessive cost of harvesting tomatoes by hand has forced growers to resort to mechanized harvesting. A number of different types of tomato harvesting machines have been marketed in recent years. In general, such machines have included stationary or reciprocating cutter bars or dual rotating cutters which cut the stems or root systems of the tomato plants and delivered the plants and fruit to a number of conveyer belts.

The severed plants are vibrated while being conveyed by the conveyer belts for the purpose of removing the fruit from the tomato stalks or vines. The separated tomatoes may be subjected to various additional vibrating actions for cleaning and then passed on to an inspection station, where they are visually inspected and sorted before being conveyed to a field transport vehicle.

In the past, certain tomato harvesters having a pair of disc cutters rotating in opposite directions have been used to sever the tomato plants and remove them from the soil. In these harvesters, the severed tomato plants and their fruit are directed towards the center of a relatively narrow conveyer belt and have tended to pile up in the center of the belt rather than being evenly distributed over the conveyer belt. This arrangement makes it difficult to shake the tomatoes from the vines, generally necessitating vibrators which operate at higher amplitudes and/or frequencies, or vibrators with longer belts to assure that all the desired tomatoes are shaken from the vines.

Many tomato fields are bedded or hilled, resulting in rows of tomatoes that are grown in positions not perpendicular to the soil surface. Consequently, when a double disc cutter is used, the stems of the tomato plants are severed at different heights. To assure that all the plants are cut at the bottoms of the stems, the cutters are forced deep into the soil. This requires greater driving forces to operate the cutting discs.

With the high costs involved in visually inspecting the separated fruits on a harvesting machine, it is highly desirable to minimize the amount of time required in final inspections. Therefore, the more unacceptable fruits which can be eliminated prior to the final visual inspection, the less expensive and more efficient would be the harvesting machine.

It is an object of this invention to provide an improved cutting arrangement for a harvesting machine.

It is a further object of this invention to provide an improved harvesting machine wherein plants are severed from the soil over a wide row width, lifted, delivered, and evenly distributed over the entire width of a conveyer belt.

It is still a further object of this invention to provide an improved cutting arrangement for a harvesting machine wherein a mechanical assemblage of circular cutters is adaptable to cut over rows of different contours and shapes in relation to a horizontal soil surface.

It is still a further object of this invention to provide improved means for initially sorting individual fruits according to their unit weights by mechanical means.

In accordance with the present invention, a harvesting machine for cutting crops on a vine and then separating the fruit from the vine by vibrating means is provided. At least four rotating disc cutter blades provide a wide area for cutting the crops and lifting and spreading the cut vines on to a conveyor belt. After the fruits, such as tomatoes, have been separated from the vines, they are passed under a vacuum apparatus, where the unripe or light tomatoes are separated from the ripe or heavier tomatoes prior to final visual inspections.

Other objects and advantages of this invention will be apparent and suggest themselves to those skilled in the art, from a reading of the following specification and claims, in conjunction with the accompanying drawings in which:

FIG. 1 is a sideview of the innovative harvester being moved by a conventional farm tractor.

FIG. 2 is a rear view of the harvester loading a transfer trailer.

Figure 5:
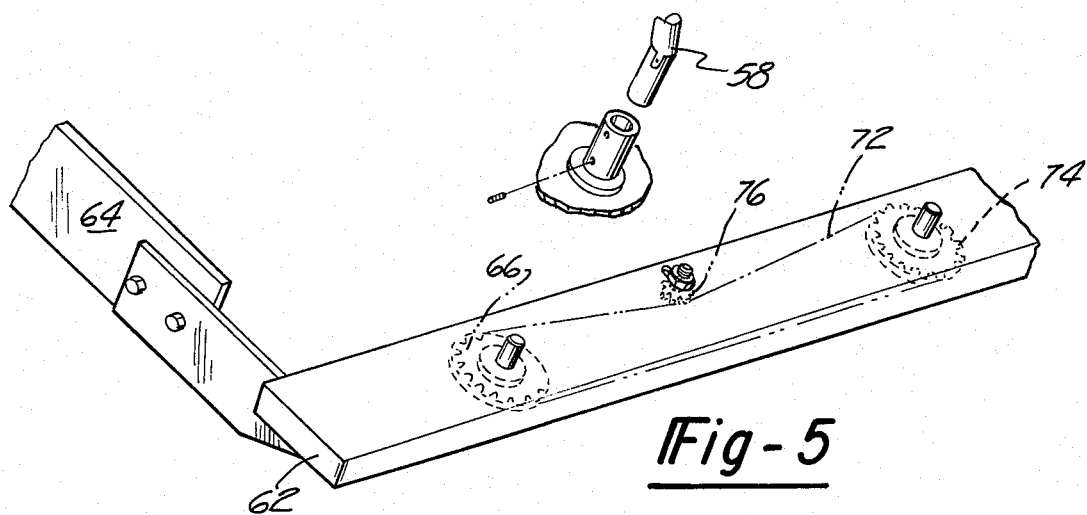
FIG. 5 is a cut-away sectional view of the drive system of a pair of cutters.

While this harvester is not intended to be used exclusively for tomatoes, for ease of illustration and explanation of operation thereof, the harvesting of tomatoes will be used as an example.

Referring now to the drawings, as best seen in FIG. 1, the novel tomato harvester indicated generally by the numeral 10 is attached to a tractor 12 by a hydraulically adjustable (vertical and horizontal) towbar 14 for moving the harvester over the rows of tomatoes in the field.

Figure 3:
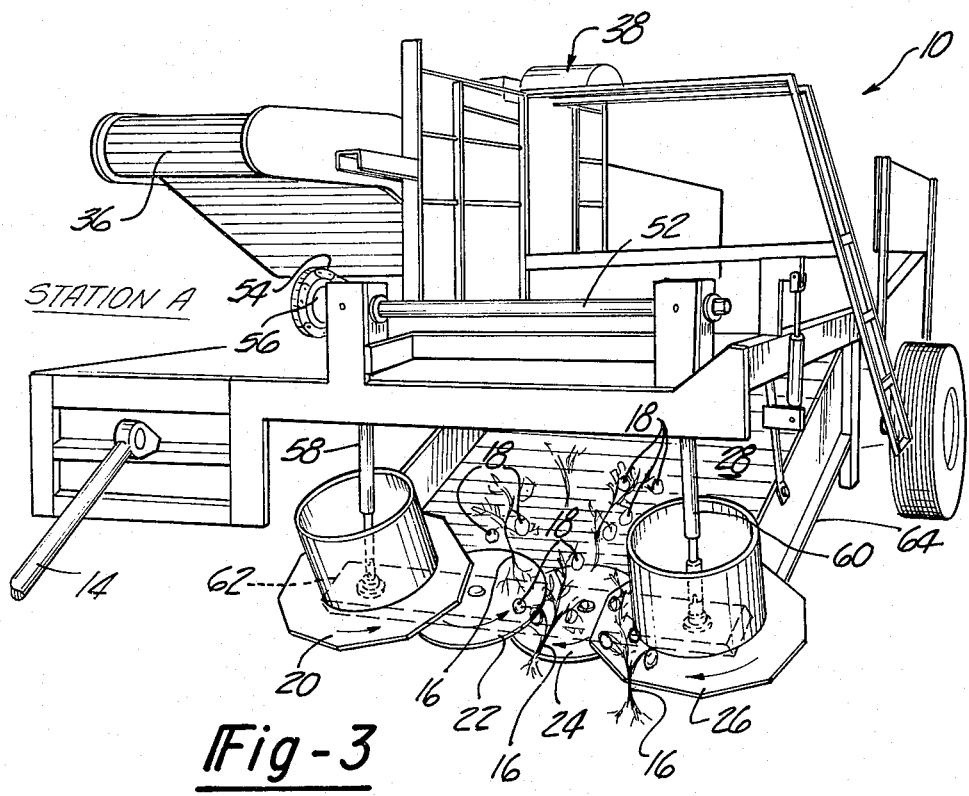
FIG. 3 is a front perspective view of the harvester showing the plants being removed from the soil.

As seen in FIG. 3, the tomato plants 16 with the tomatoes 18 attached are removed from the field as a unit by the disc blades or cutters 20, 22, 24, 26. All the cutters are rotatable, with the edges closest to or on the ground rotating toward the center of the pickup unit, as shown by the arrows. Such rotation causes the plants or vines to be cut free of the soil and funnels them toward the center of the cutters. As the plants 16 pass over the cutters and delivered to the shaker-conveyer 28, they are spread on the shaker-conveyer by the outward rotation at the cutter edges adjacent the shaker-conveyer 28.

As best seen in FIG. 1, the shaker-conveyer receives the plants 16 and shakes the tomatoes 18 loose therefrom as the plants, tomatoes, and field debris are conveyed away from the cutters, shaken and deposited on concurrent conveyers 30, 32. Rough conveyer 30 is above the tomato conveyer 32 at the discharge area of shaker-conveyer 28. The vine carrying rough conveyer 30 receives the tomato plants 16 and other large debris and discharges it back to the field to the rear at the harvester. The tomatoes 18 drop through the larger openings between the cross bars of the rough conveyer 30 to the tomato conveyer 32 and are discharged on the cross conveyer 34, best seen in FIG. 2. The cross conveyer 34 deposits the tomatoes, in all stages of maturity as removed from the vine, onto the lift conveyer 36 for moving the tomatoes to the inspection station. As the tomatoes are deposited on the lift conveyer 36, they pass under a vacuum sorter unit 38.

Figure 4:
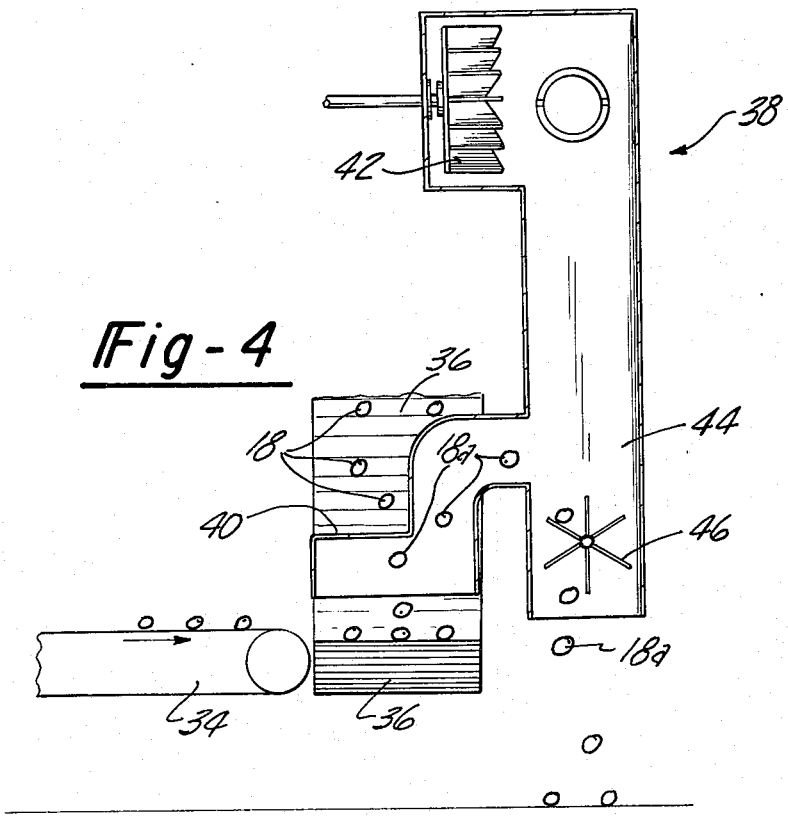
FIG. 4 is a cut-away sectional rear view showing the rejectable fruit being lifted by a vacuum from the conveyer and rejected through the reject chute.

Because there is a difference in density between green and ripe tomatoes, the weight differential is utilized to separate the undesirable green tomatoes from the ripe ones. As the tomatoes are passed under the pick-up head 49, vacuum separator 38, as best seen in FIG. 4, the lighter in weight green tomatoes 18A are removed from the lift conveyer 36 into the vacuum separator 38 by the vacuum therein created by the fan 42. The vacuum separator 38 also removes dirt and light debris that was not removed by the rough conveyer 30.

The cross-sectional area at the pick-up head 40 is approximately one half the cross-sectional area of the reject chute 44. As the lighter in weight green tomatoes 18A pass into the reject chute 44, the reduced air velocity due to the larger area causes the reject tomatoes 18A to drop through the rotary vanes 46 to the ground. The tomatoes remaining on lift conveyer 36 are raised to Station A where one inspector removes the few rejects that were not separated by the vacuum separator 38.

Referring now to FIGS. 1 and 2, the selected tomatoes are dropped from the lift conveyer 36 to a loading conveyer 48 which transports them into the transport vehicle 50 for removal from the field.

The various conveyers and operating portions of this harvester are powered by conventional power units connected by necessary belt and chain drives.

Figure 6:
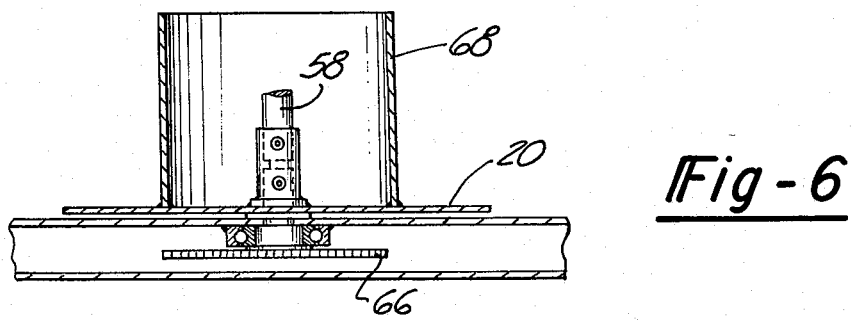
FIG. 6 is a cut-away sectional view showing the connection between the drive shaft and the drive gear for a side cutter.

Referring now to FIGS. 3, 5, and 6, the novel cutter heads 20, 22, 24, and 26 are driven by drive shaft 52 connected to a power source (not shown) by chain 54 and sprocket 56 keyed to shaft 52. Vertical power shafts 58 and 60 are operably connected to the drive shaft 52 by bevel gear sets and transmit power from the drive shaft 52 to the cutters.

The cutters 20, 22, 24 and 26 are rotatably supported on gear box 62 which is rigidly supported on the vertically adjustable frame 64 at the harvester 10.

The cutters are divided into a right 20, 22, and left 24, 26 sets of cutters. Their operation is the same except for opposite rotation and therefore only the right set's operation will be described. As best seen in FIGS. 5 and 6, vertical power shaft 58 is connected to cutter sprocket 66 which is journaled in gear box 62 and has cutter 20 rigidly secured thereto for rotation therewith. A protective shield 68 is secured to cutter 20 and shield 70 is secured to cutter 26 to protect the connection between the vertical power shaft and the cutter sprocket and for purposes to be described in the operation of the harvester.

The simplified drive unit seen in FIG. 5 includes the cutter sprocket 66, cutter drive chain 72, and auxiliary cutter sprocket 74 journaled in gear box 62 and drivingly secured to cutter 22. A slack adjuster sprocket 76 is rotatably secured in the gear box 62 for maintaining and adjusting the tension in cutter drive chain 72. Thus it can be seen that, as the power shaft 58 is rotated, both cutters 20 and 22 will be rotated as a unit.

Figure 7:
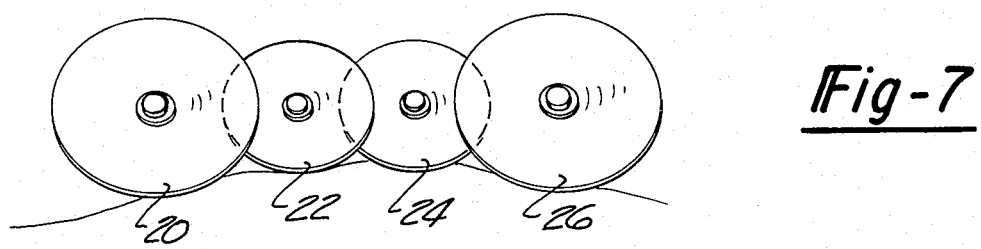
FIG. 7 illustrates a set of cutters having larger side cutters.
Figure 8:
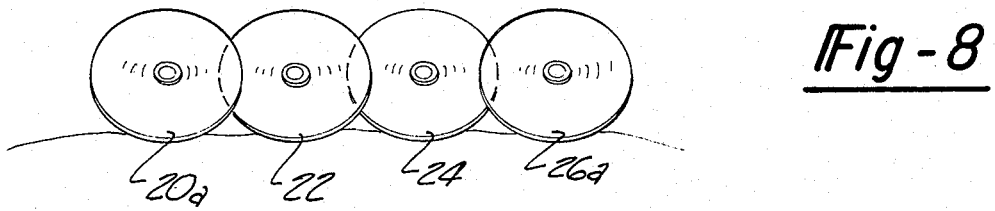
FIG. 8 illustrates a uniform set of cutters.

In the operation of this harvester, the cutters are positioned as seen in FIG. 7 or FIG. 8 depending on the method of planting. If a hill system is used for the plants, FIG. 7 illustrates the cutters in position; but if a level system is used, uniform cutters 20a, 22, 24, and 26a are used as seen in FIG. 8.

As the harvester is moved down the row, the cutters sever the plants from the earth and with the aid of the protective shields, direct the plants to the shaker-conveyer. As the plants pass from the conveyer side of the cutters, the rotation of the cutters spread the plants on the shaker-conveyer for better removal of the tomatoes from the plants as they move up the shaker-conveyer. The removed tomatoes are dropped on the tomato conveyer and the debris and cleaned tomato plants are dropped on rough conveyer and discharged back onto the field at the rear of the harvester. The tomatoes are delivered to the cross conveyer and taken to the lift conveyer for separation. As the tomatoes are moved on the lift conveyer, they pass under the vacuum separator which removes the immature lighter green tomatoes and returns them to the field. The riper tomatoes proceed on the lift conveyer past the inspection station for further culling and then are dropped on the loading conveyer and deposited in a transport carrier for removal.

While only one embodiment of this novel harvester has been shown and explained, it is to be understood that there may be various embodiments and modifications within the scope of the following claims of this invention.

It is seen that the subject invention has provided an improved tomato harvesting machine wherein high efficiency is provided in cutting crops over a wide area and spreading the cut crops over a wide area on a shaker conveyer belt. The sorting of the cut crops by weight minimizes the amount of time required in final visual inspections.

What is claimed is:

1. A harvesting machine for removing plants and their fruit from their fields of growth comprising a supporting chasis, at least four aligned cutters rotatably mounted on said chasis for operably engaging and severing said plants and delivering said plant and fruit thereon onto said harvesting machine, a shaker-conveyer adjacent said plurality of cutters for receiving said severed plants and fruit, said plurality of cutters including at least four aligned discs rotable towards the center of and in the direction of said shaker-conveyer to spread the severed plants as they are delivered to said shaker-conveyer, said shaker-conveyer being movably mounted on said chasis and having vibration means for removing said fruit from said plants and conveyer means for transporting said fruit and said plants, said conveyer means being dimensioned in width to extend beyond the width at the two center cutters and to the centers of the two outmost cutters, a rough conveyer and a fruit conveyer operably mounted on said chasis for receiving said fruit and said plants from said shaker-conveyer, drive means for operably moving said rough conveyer and said fruit conveyer in generally concurrent paths, said rough conveyer being positioned outside of said fruit conveyer for receiving said plants and for allowing said fruit to pass therethrough to said fruit conveyer, said rough conveyer transporting said plants over said fruit and returning said stripped plants back to the field, said fruit conveyer receiving and transporting said fruit, a cross conveyer operably supported on said chasis for receiving said fruit from said fruit conveyer and moving said fruit, a lift conveyer operably mounted on said chasis adjacent said cross conveyer for receiving said fruit from said cross conveyer, said fruit having unripe lighter fruit and ripe heavier fruit, a vacuum means positioned along the path of said lift conveyer, said vacuum means disposed to lift said lighter fruit from said lift conveyer and return said lighter fruit to said field, a loading conveyer operably mounted on said chasis for receiving said ripe fruit from said lift conveyer conveying said ripe fruit from said harvester to a transport means for removing the ripe fruit from the field.

2. A harvesting machine as set forth in claim 1 wherein said four aligned discs include two outermost discs and two innermost discs, with said innermost discs being smaller in diameters than said outermost discs, whereby said four discs are disposed to conform generally to the contour of a curved section of a field being harvested.

3. In combination with a harvesting machine for removing plants with fruit thereon from a field and subsequently separating the fruit from the plants as said harvesting machine moves along said field, at least four cutter discs including two outer discs and two inner discs disposed forwardly of said harvesting machine for severing said plants with fruit from a field, a movable conveyer belt for receiving the plants with fruit severed by said cutter discs, said movable conveyer belt being dimensioned in width to extend beyond said two inner discs to the centers of said outer discs, said cutter discs being aligned with respect to each other in a direction perpendicular to the direction of motion of said harvesting machine, means for rotating said outer discs in opposite directions with respect to each other with the directions of rotations being towards the center of and in the general direction of the movement of said conveyer belt, means for rotating said inner discs in opposite directions with respect to each other with the directions of rotations being towards the center of said conveyer belt whereby plants with fruit in a field are severed by said cutter discs along the width of said aligned cutter discs with the rotations of said cutter discs causing the severed plants with fruit to be spread along the width of said conveyer belt.

4. A combination as set forth in claim 3 wherein said two inner discs are smaller in diameters than said two outer discs whereby said aligned cutter discs are disposed to conform to a curved portion of a field in which said plants with fruit are severed.

\* \* \* \* \*